Aug. 19, 1952     L. G. BOWEN     2,607,878
ELECTRIC LIQUID HEATER
Filed Aug. 8, 1950     2 SHEETS—SHEET 1
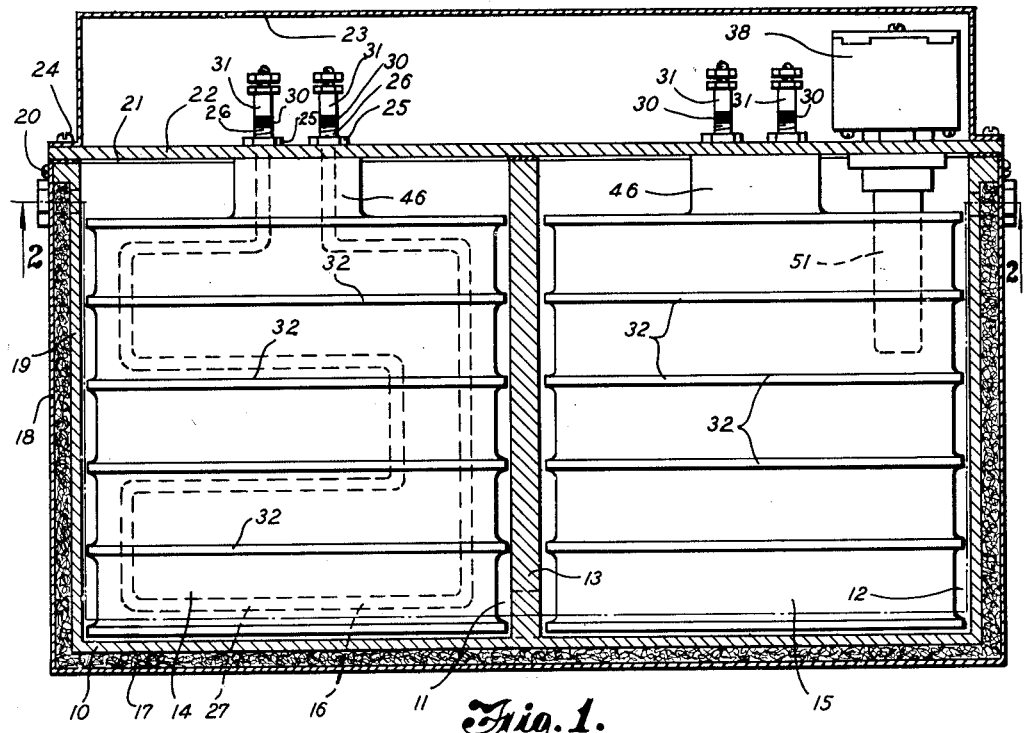
Fig.1.
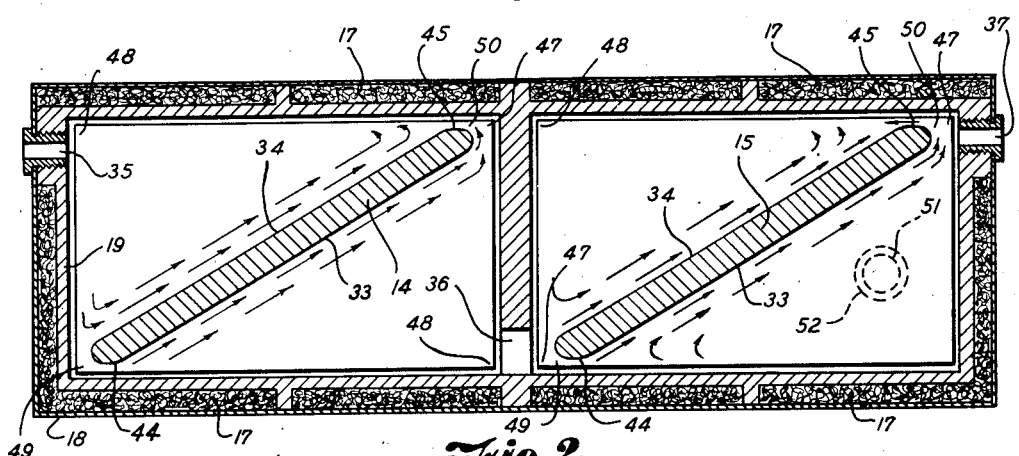
Fig.2.
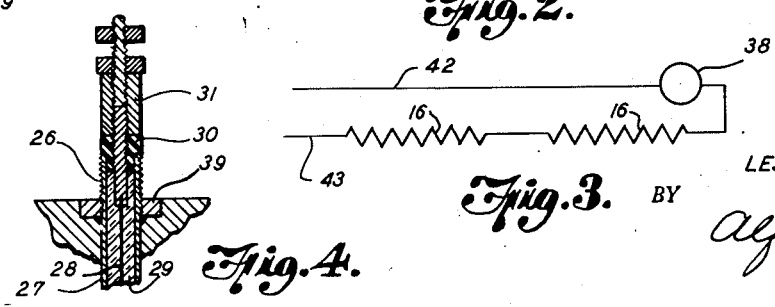
Fig.3.
Fig.4.
INVENTOR.
LESLIE G. BOWEN
BY
Alfred R. Fuchs
ATTORNEY INVENTOR.
LESLIE G. BOWEN
BY
Alfred R. Fuchs
ATTORNEY Patented Aug. 19, 1952

2,607,878

UNITED STATES PATENT OFFICE 2,607,878

ELECTRIC LIQUID HEATER

Leslie G. Bowen, Evanston, Ill.

Application August 8, 1950, Serial No. 178,257

15 Claims. (Cl. 219—39)

My invention relates to liquid heaters, and more particularly to an electric liquid heater.

It is the principal purpose of my invention to provide a heater for heating liquid to a high temperature rapidly, that is adapted to be located in a restricted space, particularly a space that is restricted in vertical dimension. In connection with the use of glasses, dishes and other utensils, in public places, it is a health requirement in many communities that these glasses, dishes and utensils be sterilized by means of water at a high temperature slightly below the boiling point of water. The ordinary tank water heater does not heat water to a high enough temperature at the point of use without the possibility of boiling the water in the heater, to accomplish this purpose. Accordingly one of the important uses of my heater is to raise the temperature of water obtained from the ordinary hot water system supplied by means of a tank heater, rapidly to a temperature such that it is high enough for the sterilization of glasses and similar vessels. In order to accomplish this, ordinarily relatively small quantities of water at a temperature slightly below the boiling point, are required at frequent intervals, and my improved liquid heater is constructed to accomplish such heating.

While my improved liquid heater is particularly adapted for use for heating water for the above referred to purpose, in restricted spaces in which the heater has to be placed, if it is to be closely adjacent the point of use of the water, it is also adapted for use in heating other liquids for other purposes to high temperatures rapidly.

In order to accomplish the above referred to purpose, my improved liquid heater comprises a housing that is divided into a pair of compartments by means of a partition and which has heating means in each of the compartments, the inlet and outlet end connections and connection between the compartments being so arranged that the liquid flowing into one compartment has to flow around the heating means in said compartment to pass into the other compartment and has to flow around the heating means in said other compartment before it reaches the outlet in said other compartment to which suitable conduit means may be connected for conveying the water or similar liquid to the point of use. The compartments are preferably of such size that the amount of liquid used each time that liquid is withdrawn from the second mentioned compartment is all withdrawn from said second compartment, and liquid that has previously been heated in the first compartment passes into the second compartment to take the place of the liquid that was used, the water or other liquid entering the first mentioned compartment to be heated therein preliminary to passing into the second compartment. Thus the first compartment serves as a pre-heating compartment and the second compartment serves as means for heating the liquid to the temperature at which it is to be used.

It is a particularly important purpose of my invention to provide a heating device in each of the compartments that also acts as baffling means in the compartment, so that if the apparatus is used in the preferred manner the heating means will provide a baffle that inclines upwardly from the inlet side of each compartment toward the outlet side of each compartment. This will cause the liquid that is at the lowest temperature in the particular compartment to travel upwardly along the inclined wall, either on the lower or upper face thereof and thus circulate in said compartment.

Furthermore my invention comprises a heating device in each compartment that has, not only a wall that serves as a baffle, but fins thereon that, in cooperation with the walls of the compartment, serve as means to provide liquid heating chambers or passages in each compartment, each of which has either an inclined bottom wall or an inclined top wall, and each heating passage or chamber is provided with walls that are highly heated on three sides thereof, thus rapidly heating the liquid in each passage or chamber. The fins on the baffle member and the baffle member extend into adjacency with the walls of the compartments, so that these heating chambers or passages are formed. There is an opening provided establishing restricted communication between the one end of each chamber or passage and the chamber or passage vertically adjacent thereto, to thus control the circulation of liquid in each of the passages or chambers and prevent the too rapid passage thereof from the inlet into the lower chambers and to the outlet from the upper chambers.

It is another important purpose of my invention to provide heating means in each of the compartments, that is so constructed and arranged that the same can be readily removed from the compartments and cleaned. In order to facilitate cleaning of the heating means in each compartment, the baffle members and the fins are provided with flat faces and the fins extend in relatively widely spaced relation perpendicularly to the flat faces of the body portion of the heating means that constitutes the baffle member. It will be obvious that with such an arrangement any scale or other deposit that may form on the heating means can be readily scraped off upon removal of the heating means from the compartment.

It is another purpose of my invention to provide a heating device in each compartment that comprises a body portion of metal, that is a very good heat conductor, such as aluminum, or alloys that include aluminum, and are of high heat conductivity, in which is cast a heating element that is provided with an outer metallic sheath, in which a resistance element is provided, which resistance element is insulatingly mounted within the sheath so that the heating element with the sheath thereon can be cast directly in the aluminum or similar metallic body portion of the heating device and yet be electrically insulated therefrom. As a result of this mounting of the heating element or elements in the metallic body portion of the heating device, the heating element is in direct heat conducting relation to the metal of the heating device and the body portion of the heating device or baffle and the fins thereon are both heated to substantially the same temperature throughout.

It is another important purpose of my invention to provide means for controlling the operation of the heating elements in the heating means, comprising a thermostatic element or elements, so mounted as to be in closely spaced relation to a heating device in one of the compartments. This is done in order to assure the operation of the thermostatic controlling means even should there be no water in the compartments, as the proximity of the thermostatic means to the heating device will cause the thermostatic element to open the circuit, should the heating device become overheated in case no water is in the compartment. Ordinarily the water in the second or outlet compartment will surround the thermostatic controlling device in such a manner as to operate the same to discontinue operation of the heating means in the second or outlet compartment of the liquid heater when the temperatures therein reaches from 190° to 195°.

It has been found desirable in certain instances to provide means for controlling the heating of the heating means in the compartments in such a manner that heating is continued beyond the temperature at which the above referred to thermostatic means will break the circuit to the heating element above referred to. In order to accomplish this, two heating elements are provided in each of the heating means in each compartment and one heating element of each pair is controlled by the thermostat above referred to, while the second heating element in each compartment is controlled by another thermostat, that is provided in the first or inlet compartment, and which is actuated to break the circuit to said second heating element upon a lower temperature being reached in said first or inlet compartment, preferably, about 165°.

By providing such a control the heating apparatus will operate in a similar manner to a storage heater, in that a reserve supply of heated liquid will be available after the thermostatic element in the outlet compartment has operated to shut off one heating element of each pair, as the controlling means for the second heating element will permit heating to continue beyond that obtained from the first heating element. Said second controlling means is so set that it will discontinue all heating before the temperature in the outlet compartment reaches the boiling point of the liquid, such as the boiling point of water, for example. However, should water be withdrawn from the outlet compartment, which will not immediately affect the thermostat in the outlet compartment, it will affect the thermostat in the inlet compartment, as cooler water is entering the inlet compartment. This will cause the heating elements controlled by this thermostat to be energized to begin heating the water before the thermostatic control in the outlet compartment will close the circuit to the heating elements it controls, so that the time interval for bringing the water in the outlet compartment again up to the maximum temperature suitable for use for sterilizing will be shortened.

Other objects and advantages of my invention will appear as the description of the drawings proceeds. I desire to have it understood, however, that I do not intend to limit myself to the particular details shown or described, except as defined in the claims.

In the drawings:

Fig. 1 is a horizontal section of the improved single element heater, immediately below the top wall thereof.

Fig. 2 is a vertical section taken on the line 2—2 of Fig. 1.

Fig. 3 is a wiring diagram of the single element heater circuit.

Fig. 4 is a detail section through a terminal of one of the heating elements.

Figure 5:
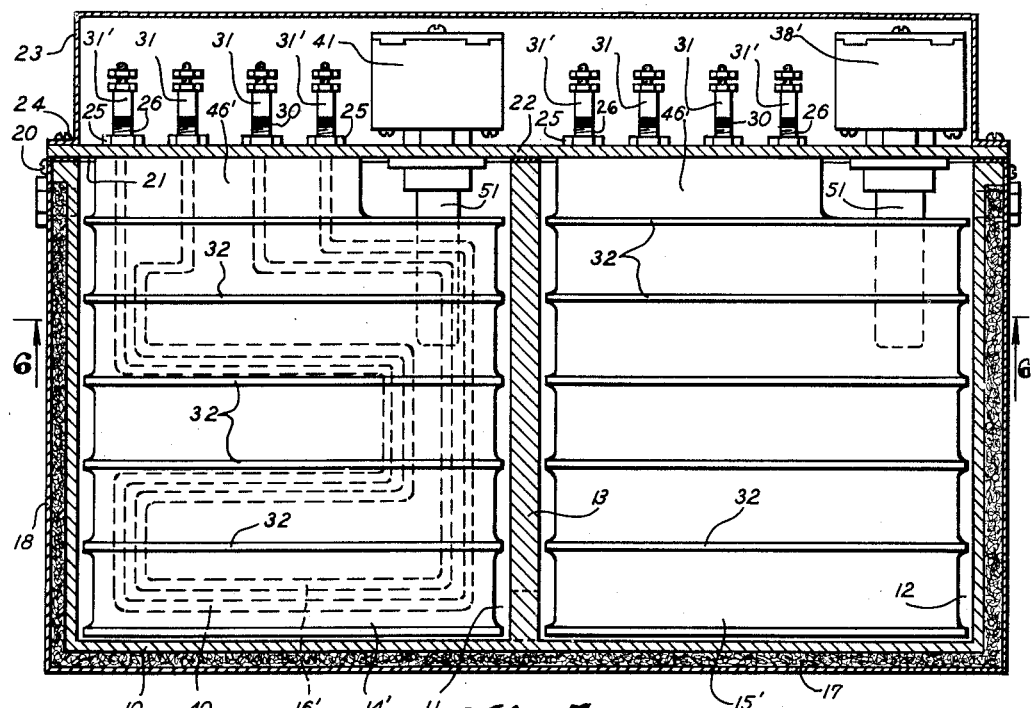
Fig. 5 is a horizontal section, similar to Fig. 1, of the double element type heater.

Referring in detail to the drawings, my improved liquid heater shown in Figs. 1 and 2 comprises a housing 10 divided into a pair of compartments 11 and 12 by a partition 13. A baffle 14 in compartment 11 and a baffle 15 in compartment 12 each contains a single heating element 16. The housing 10 is of a double wall construction with heat insulating material 17 between said walls. The outer wall 18 is fastened to the inner wall 19 by suitable fastening elements 20. A gasket 21 is provided between the end wall 22 and the inner wall 19 and partition 13. A cover 23 is secured to the end wall by fastening elements 24. Fastening elements 24 also secure the end wall 22 to the inner compartment wall 19.

The baffle 14 is secured rigidly to the end wall 22 by nuts 25 on the threaded portions 26 of the heating element 16, which is cast within said baffle. The baffle 14 is provided with fins 32 having their marginal edges lying adjacent the inner walls of the compartments and with said walls form a plurality of liquid heating chambers. As shown in Fig. 2, the baffle 14 is inclined from the inlet side of compartment 11 upwardly to the outlet side of compartment 11, and similarly the baffle 15 is inclined upwardly from the inlet side of compartment 12 to the outlet side thereof. The baffles 14 and 15 have parallel faces 33 and 34, from which the parallel fins 32 extend perpendicularly. Circulation, as shown by the arrows in Fig. 2, is caused within each chamber because of the inclination of the baffle 14, the water or other liquid tending to travel up said inclined faces as it is heated.

Liquid flow within the heater progresses from the inlet 35 of compartment 11 and successively through the chambers in said compartment lying side by side to the outlet 36 of compartment 11. The outlet 36 of compartment 11 also serves as the inlet for compartment 12 and the flow progresses in the same manner successively through the chambers lying side by side in said compartment 12 to the outlet 37, across the fins 32 on baffle 15. In both compartments the inlet is located in the diagonally opposite corner from the outlet to provide the same distance from said inlet to said outlet both above and below the baffle. The flow from each chamber to the horizontally adjacent chambers in each compartment takes place in the restricted space between the edge of the fin 32 and the adjacent wall of the compartment. A thermostatic switch 38 is provided near the outlet 37 in the final chamber of compartment 12, said switch 38 having a tubular housing 51 for the thermostatic element thereof extending through openings 52 in a plurality of the fins 32.

The heating elements 16 in the baffles 14 and 15 are of a well known type, consisting of a hollow tube 27 containing a resistance wire 28 and ceramic insulating material 29 between said wire and said tube. Electrical insulating means 30 is provided between the terminal 31 and the tube 27. The hexagonal nut 39 is welded to the tube 27 to prevent rotation of the tube after it is cast integral with the baffles 14 and 15. The circuit for the single heating element baffles 14 and 15 is shown in Fig. 3, the heating elements 16 in said baffles being connected in series with each other and with the thermostatic switch 38, between the conductors 42 and 43 leading from a suitable source of electrical energy.

It will be noted that the baffles 14 and 15 have their lower marginal edges 44 located closely adjacent the bottom walls and the side walls at the inlet sides of the compartments 11 and 12, respectively, and their upper marginal edges 45 located closely adjacent the top walls and the side walls at the outlet sides of the compartments 11 and 12, respectively. The fin 32 at the inclined marginal edge of each of the baffles 14 and 15 adjacent the end wall 22 is spaced therefrom by the mounting lug 46 provided on each baffle, which is clamped against the end wall 22 by the nuts 25 engaging the threaded portions 26, so that said baffles are removable as a unit with said end wall 22. The mounting lugs 46 space the marginal fins 32 from the end wall 22 to reduce conduction of heat from said fins to said end wall and to provide inlet and outlet chambers into which the inlet connection 35 and from which the outlet connection 37 leads, respectively.

The fins 32 have their marginal edges lying closely adjacent the walls of each compartment, said fins gradually increasing in height from the corners 47 thereof lying endwise beyond the marginal edges 44 and 45 of the baffles to the corners 48 thereof. The baffles, fins and adjacent walls of the compartments thus provide a series of horizontally adjacent elongated chambers above and below said baffles, the vertically adjacent chambers between vertically aligned fins being in communication through the restricted passages 49 and 50 between the marginal edges 44 and 45 and the compartment walls.

Figure 6:
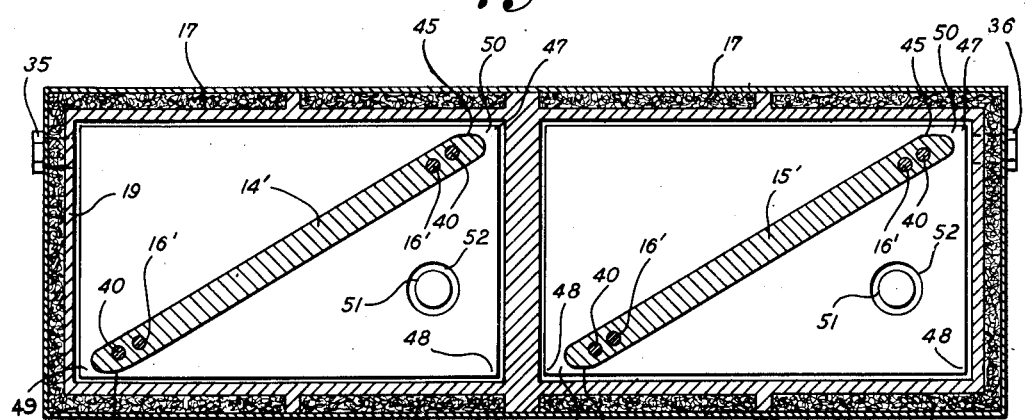
Fig. 6 is a vertical section taken on the line 6—6 of Fig. 5.

In the form of my invention shown in Figs. 5 and 6 my liquid heater comprises a housing 10 divided into a pair of compartments 11 and 12 by a partition, as in the previously described form. The baffle 14' in compartment 11 and the baffle 15' in compartment 12 each contain two heating elements 16' and 40. The liquid flow through each compartment around the fins from chamber to chamber is the same as previously described. An additional thermostatic switch 41 is provided in chamber 11 to control the heating elements 40, as will be described below. The thermostatic switch 38' in chamber 12 controls the heating elements 16' in the same manner as in switch 38.

Figure 7:
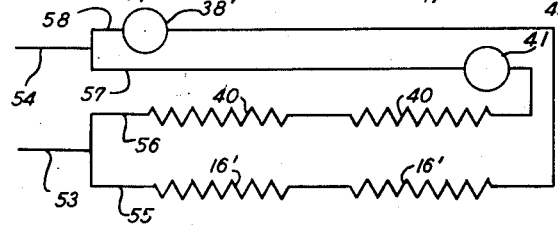
Fig. 7 is a wiring diagram of the double element heater circuit.

Referring to the circuit diagram in Fig. 7, the heating elements 16' are in series with each other and with the thermostatic switch 38' and the resistance elements 40 are in series with each other and with the thermostatic switch 41, the switches 38' and 41 being the same in construction as the switch 38. The conductor 53 and the conductor 54 lead from a suitable source of electrical energy. From the conductor 53 the branch lines 55 and 56 lead to one end of one of the resistances 16' and 40, respectively, while the branch lines 57 and 58 lead from the thermostatic elements 41 and 38', respectively, to the conductor 54. Thus the heating elements or resistances 16' are connected in series and the resistance elements 40 are connected in series, but the resistance elements 16' and 40 are in parallel with each other, as are the thermostatic elements 38' and 41.

The baffles 14' and 15' and the baffles 14 and 15 are alike in construction except for the inclusion of a pair of heating elements in the baffles 14' and 15' and the provision of considerably larger clamping lugs 46' on the baffles 14' and 15', providing for the mounting of the additional terminals 31', which are identical with the terminals 31, but are connected with the heating element 40. As all the other parts of the apparatus are the same in the form shown in Figs. 5 and 6 as that shown in Figs. 1 and 2, the same reference numerals are applied to corresponding parts thereof.

It will be noted that the housings 51 for the thermostatic elements of the thermostatic switches 38, 38' and 41 extend through the openings 52 in a plurality of the fins 32 in the lower portions of the compartments 12 and 11 and that these tubular housings 51 are closely adjacent, but spaced slightly from the walls of the openings 52 in said fins. Thus the thermostatic elements in the tubes 51 will be caused to operate to open the circuit if the temperature of the adjacent fins exceeds the temperature, at which the adjustable thermostatic elements 38, 38' or 41 are set, to any great extent, even if no water is in the compartments 11 and 12, as the air in the narrow space surrounding the tubular member 51 will transfer the heat from the fin 32 having such an opening 52 to the tubular member 51 and thus to the thermostatic element, but when water is in the compartment 12, or in the compartments 11 and 12 in the form of the invention shown in Figs. 5 and 6, the thermostatic elements will be responsive to the temperature of the water and not to the temperature of the fin 32 adjacent said tubular member 51.

In the operation of my liquid heater as shown in Figs. 1 and 2, preheated water from an ordinary hot water system enters the inlet 35 to compartment 11 at approximately 140° F. As the water enters the first chamber of the compartment 11 formed by the fins 32 and the inner walls of the compartment 11, violent circulation takes place on both sides of the inclined faces 33 and 34 of the baffle 14. As the water is withdrawn it moves successively from chamber to chamber between the fins 32 and the inner walls of the compartment 11. Similarly the water enters compartment 12 through the passage 36 and advances from chamber to chamber to the outlet 37 of the compartment 12. The thermostatic switch 38, which is located near the outlet 37, extends through holes in the fins 32 in the final two chambers of compartment 12 to regulate the outlet temperature of the water at approximately 190° to 195° F.

The heating elements cast within the baffles 14 and 15, which are made of excellent heat conducting metals, such as aluminum or aluminum alloys, provide uniform heat on three sides of each chamber formed by the baffle face and parallel fins. The current to these heating elements is regulated to give the desired outlet temperature by the thermostatic switch 38.

In the form of the invention shown in Figs. 5 and 6, water flow is the same as described in the previous form, but a minimum temperature of 165° F. is maintained within the chamber 11. This is accomplished by having two heating elements in each baffle, one controlled by the thermostatic switch 38' and the other controlled by the thermostatic switch 41. When the outlet temperature reaches 190° to 195° F., the heating element 15' in each baffle is cut out and the heating elements 40 remain on, as the temperature in compartment 11 is not above 165° F. in compartment 11, at which time they are cut out. This maintains all the water in compartment 11 at a temperature of 165° F. for rapid heating to 190° or 195° F. when the other elements 16' are again energized.

While the heater is adapted for use for heating any liquid, it is particularly adapted for heating water rapidly to a temperature suitable for sterilizing glasses and similar vessels, and the above description of the operation thereof particularly refers to such use. When so used the valve controlling flow of liquid through the heater is in the inlet connection and the outlet connection is open to the atmosphere, and accordingly the liquid in the heater is at atmospheric pressure at all times.

What I claim is:

1. In a liquid heater, a housing, a partition dividing said housing into a pair of compartments, an inlet connection leading into one of said compartments, a discharge connection leading from the other of said compartments, said partition having a passage therethrough connecting said compartments, a baffle in each compartment interposed between said passage and connection, heating elements in said baffles and temperature responsive means controlling energization of said heating elements.

2. In a liquid heater, a housing, a partition dividing said housing into a pair of compartments, an inlet connection leading into one of said compartments, a discharge connection leading from the other of said compartments, said partition having a passage therethrough connecting said compartments, an obliquely extending baffle in each compartment interposed between said passage and connection, heating elements in said baffles and temperature responsive means controlling energization of said heating elements.

3. In a liquid heater, a housing, a partition dividing said housing into a pair of liquid compartments, an inlet connection leading into one of said compartments, a discharge connection leading from the other of said compartments, said partition having a passage therethrough connecting said compartments, an inclined baffle in each compartment interposed between said passage and connection, said baffle having a plurality of parallel fins thereon defining liquid passages between the same, heating elements in said baffles and temperature responsive means extending across a plurality of said liquid passages controlling energization of said heating elements.

4. In a liquid heater, a housing, a partition dividing said housing into a pair of compartments, an inlet connection leading into one of said compartments, a discharge connection leading from the other of said compartments, said partition having a passage therethrough diagonally opposite both of said connections connecting said compartments, an oblique baffle in each compartment interposed between said passage and connection, heating elements in said baffles and temperature responsive means controlling energization of said heating elements.

5. In a liquid heater, a housing, a partition dividing said housing into a pair of compartments, an inlet connection leading into one of said compartments, a discharge connection leading from the other of said compartments, said partition having a passage therethrough connecting said compartments, a baffle in each compartment interposed between said passage and connection, heating elements in said baffles and temperature responsive means extending into said other compartment in adjacency to said baffle controlling energization of said heating elements.

6. In a liquid heater, a housing, a partition dividing said housing into a pair of compartments, an inlet connection leading into one of said compartments, a discharge connection leading from the other of said compartments, said partition having a passage therethrough connecting said compartments, a baffle in each compartment interposed between said passage and connection, a pair of heating elements in each of said baffles, temperature responsive means in one of said compartments controlling energization of one heating element of each pair, and temperature responsive means in the other of said compartments controlling energization of the other heating element of each pair.

7. In a liquid heater, a housing, a partition dividing said housing into a pair of compartments, heating means in each of said compartments, each heating means having a pair of heating elements, temperature responsive means in one of said compartments controlling energization of one heating element of each pair, and temperature responsive means in the other of said compartments controlling energization of the other heating element of each pair, said heater having means for passing liquid into engagement with the heating means in said compartments successively.

8. In a liquid heater, a housing, a partition dividing said housing into a pair of compartments, an inlet connection leading into one of said compartments, a discharge connection leading from the other of said compartments, said partition having a passage therethrough connecting said compartments, a baffle in each compartment interposed between said passage and connection, said baffles having parallel flat faces from which flat faced fins extend perpendicularly, and heating elements in said baffles.

9. In a liquid heater, a housing, a partition dividing said housing into a pair of compartments, an inlet connection leading into one of said compartments, a discharge connection leading from the other of said compartments, said partition having a passage therethrough connecting said compartments, a baffle in each compartment interposed between said passage and connection, said baffles having marginal edges lying adjacent but spaced from the walls of said compartments and parallel flat faces from which flat faced fins extend perpendicularly, and heating elements in said baffles.

10. In a liquid heater, a housing, a partition dividing said housing into a pair of compartments, an inlet connection leading into one of said compartments, a discharge connection leading from the other of said compartments, said partition having a passage therethrough connecting said compartments, a baffle in each compartment interposed between said passage and connection, said baffles having marginal edges lying adjacent but spaced from the walls of said compartments and parallel flat faces from which flat faced fins extend perpendicularly, said fins extending into adjacency with the walls of said compartments to divide said compartments into a plurality of heating chambers defined by said walls, flat faces and fins, and heating elements in said baffles.

11. In a liquid heater, a housing, a partition dividing said housing into a pair of compartments, an inlet connection leading into one of said compartments adjacent an upper corner thereof, a discharge connection leading from the other of said compartments adjacent an upper corner thereof, said partition having a passage therethrough connecting said compartments adjacent the lower corners of said compartments diagonally opposite said upper corners, a baffle in each compartment inclining upwardly toward the outlet side thereof, heating elements in said baffles and temperature responsive means controlling energization of said heating elements.

12. In a liquid heater, a housing, a partition dividing said housing into a pair of compartments, an inlet connection leading into one of said compartments adjacent an upper corner thereof, a discharge connection leading from the other of said compartments adjacent an upper corner thereof, said partition having a passage therethrough connecting said compartments adjacent the lower corners of said compartments diagonally opposite said upper corners, a baffle in each compartment inclining upwardly toward the outlet side thereof and extending to adjacent the opposite walls of said compartments, and having fins thereon extending to adjacent said partition, the vertical wall opposite said partition and the top and bottom walls of said compartments, heating elements in said baffles and temperature responsive means controlling energization of said heating elements.

13. In a liquid heater, a housing, a partition dividing said housing into a pair of compartments, an inlet connection leading into one of said compartments, a discharge connection leading from the other of said compartments, said partition having a passage therethrough connecting said compartments, an oblique baffle in each compartment interposed between said passage and connection, said baffles having parallel flat faces from which parallel flat faced fins extend perpendicularly, and heating elements in said baffles, said baffles and fins being removable from said compartments as a unit.

14. In a liquid heater, a housing, a partition dividing said housing into a pair of compartments, an inlet connection leading into one of said compartments adjacent an upper corner thereof, a discharge connection leading from the other of said compartments adjacent an upper corner thereof, said partition having a passage therethrough connecting said compartments adjacent the lower corners of said compartments diagonally opposite said upper corners, a baffle in each compartment inclining upwardly toward the outlet side thereof and extending to adjacent the opposite walls of said compartments, and having parallel fins thereon extending to adjacent said partition, the vertical wall opposite said partition and the top and bottom walls of said compartments.

15. In a liquid heater, a housing, a partition dividing said housing into a pair of compartments, an inlet connection leading into one of said compartments, a discharge connection leading from the other of said compartments, said partition having a passage therethrough connecting said compartments, a baffle in each compartment interposed between said passage and connection, said baffle having a plurality of parallel fins thereon defining liquid passages between the same, one of said fins having an opening therethrough, heating elements in said baffles, and temperature responsive means controlling energization of said heating elements extending through said opening in adjacency to but spaced from the wall thereof.

LESLIE G. BOWEN.

REFERENCES CITED

The following references are of record in the file of this patent:

UNITED STATES PATENTS

| Number | Name | Date |
|---|---|---|
| 2,146,431 | Homoky | Feb. 7, 1939 |
| 2,237,808 | Berg | Apr. 8, 1941 |
| 2,421,562 | Hynes | June 3, 1947 |
| 2,511,848 | Hill | June 20, 1950 |